United States Patent

Mombächer

[11] 4,036,410
[45] July 19, 1977

[54] INJECTION MOLDING MACHINE WITH FEED PLUNGER IN HOPPER

[75] Inventor: Ingolf Mombächer, Reinfeld, Germany

[73] Assignee: Braas & Co. GmbH, Frankfurt am Main, Germany

[21] Appl. No.: 543,958

[22] Filed: Jan. 24, 1975

[30] Foreign Application Priority Data

June 29, 1974 Germany .............................. 2431421

[51] Int. Cl.² .................................................. B29F 1/06
[52] U.S. Cl. .................................... 222/255; 222/488; 222/492; 425/568
[58] Field of Search .............. 425/146, 242 R, 245 R, 425/245 NS, 376, 317 R; 222/252, 255, 378, 334, 409, 488, 492–495, 559

[56] References Cited

U.S. PATENT DOCUMENTS

| | | |
|---|---|---|
| 3,163,888 | 1/1965 | Shattuck ........................ 222/413 UX |
| 3,310,843 | 3/1967 | Mancuso ........................ 222/413 UX |
| 3,685,937 | 8/1972 | Engel .............................. 425/242 R |

FOREIGN PATENT DOCUMENTS

| | | |
|---|---|---|
| 1,500,377 | 9/1967 | France ............................ 425/242 R |

Primary Examiner—Robert B. Reeves
Assistant Examiner—David A. Scherbel
Attorney, Agent, or Firm—Toren, McGeady and Stanger

[57] ABSTRACT

An injection molding machine for plastic material comprising an injection cylinder; a displaceable element axially disposed in the cylinder, one of the cylinder and displaceable element being movable with respect to the other; an injection nozzle on one end of the injection cylinder; a feed device including a feed hopper and a plunger reciprocally mounted in said hopper in communication with the other end of the cylinder; a pressure block between the feed device and the other end of the cylinders and a substantially continuously curving passage in the pressure block.

6 Claims, 2 Drawing Figures

4,036,410

INJECTION MOLDING MACHINE WITH FEED PLUNGER IN HOPPER

SUMMARY OF THE INVENTION

This invention relates to a injection molding machine.

More specifically, the invention relates to an injection molding machine including an injection cylinder with a plunger axially disposed therein, one of the cylinder and plunger being movable with respect to the other. An injection nozzle is located on one end of the injection cylinder, and a feed device including a feed hopper and a plunger reciprocally mounted in the feed hopper is arranged on the other end.

In a known machine of the above type (see German Patent Publication No. 2,010,151), the junction between the feed device and the injection cylinder is in the form of two perpendicular bores in a pressure block. A narrow annular slot, through which the material squeezes into a retention space in front of the injection nozzle is provided between the displaceable element and the injection cylinder. It has been found that in this type of machine, particularly in case of sensitive plastic materials, the materials can easily be overheated at the perpendicular junction of the two bores mentioned above, and in the region of the displaceable element. Such overheating results, on the one hand, in undesirable striae-like inclusions and, on the other hand, in liquefaction of the material a short distance beneath the plunger, thus, feeding of the material to the injection cylinder is prevented, since in the liquid state the material tends to rise during each back or return stroke of the plunger due to the vacuum form during the return stroke.

The object of the present invention is to provide a solution to the above problem, i.e., to ensure that overheating of the processed plastic material is avoided and that continuous feed to the injection cylinder is effected.

Another object of the invention is to provide a machine of the type mentioned above which permits the injection of a variety of plastic materials having different liquefaction properties, without large expenditures for the apparatus as is the case, for example, with plastics screw extruders which must utilize different screws having varying compression for different materials. Of course, this requires length change-over times, as well as increased expenditure for the apparatus.

In a injection molding machine of the type described initially, the above problems are solved by providing a continuously curving passage at the junction between the feed device and the injection cylinder, and it is particularly advantageous if the passage is quadrantal.

It has been found that the use of such a passage ensures continuous feeding of the plastic material to the injection cylinder, without the above mentioned tendency to rise during the return stroke of the plunger, and that the material starts to liquefy in the region of the displaceable element, leaving such element in the liquid state and accumulating in a retention space in front of the injection nozzle of the injection cylinder.

A particularly favourable embodiment is obtained if a bore receiving the plunger is tangential to one end of the junction, and a concentric bore in the displaceable element is tangential to the other end of the junction.

Outwardly flaring ducts can extend from the concentric bore in the displaceable element. The ducts extend forwardly through the displaceable element and emerge from the element in the region of a double cone shaped tip. Preferably the area at the end of the ducts is in the form of an annulus between the cylinder and the displaceable element, the annulus being of variable length. The total cross-sectional area of the ducts corresponds approximately to the cross-sectional area of the concentric bore and of the passage in the junction. Because of such arrangement, i.e., by avoiding abrupt changes in cross-section, sudden increases in pressure and thus local overheating of the plastic material are avoided and the time during which the material remains in the injection cylindeer is kept very short.

As a result of the use of an annulus of variable length at the ends of the ducts, a change in the compression (pressure) in the injection cylinder can be effected by adjusting the length of the annulus to adjust for various plastics depending on their liquefaction properties. According to one embodiment of the invention, the length of the annulus is varied by making the outer part of the displaceable element movable with respect to the inner part.

The inner end of the outer part is provided with an annular, outwardly extending flange for engaging a nut on the junction element between the feed device and the injection cylinder.

In the preferred form of injection cylinder, it is recommended that, in the reverse direction of the flow of plastic material, the outer part of the injection cylinder can be moved forward on the inner part until the annulus is completely closed. This embodiment of the invention ensures that, during extrusion of plastic from the injection cylinder or during the shot, the outer part or sleeve acts as a barrier against back flow of the liquid plastic by closing the annulus.

It has been found to be very advantageous if the displaceable element is in contact with the injection cylinder over substantially its entire length. This can be achieved by moving the duct into the interior of the displaceable element. In this manner it is possible to obtain a good heat conduction of the frictional heat generated in the interior of the displacement element upon liquefaction of the plastic material, towards the outside, i.e., by way of the cylinder jacket.

The invention will now be described in greater detail with reference to the accompanying drawings wherein:

DETAILED DESCRIPTION OF THE INVENTION

Figure 1:
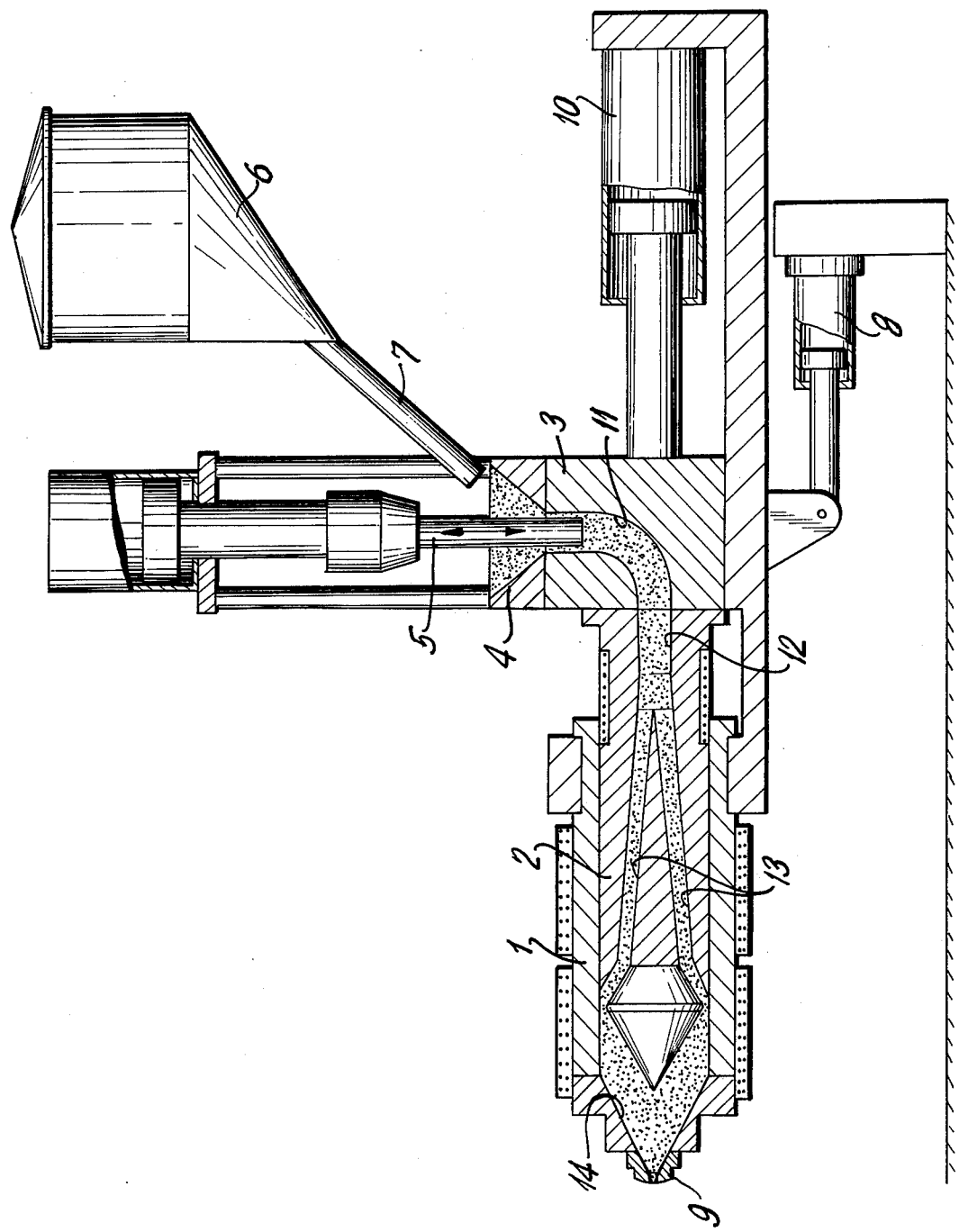
FIG. 1 is a schematic, longitudinal sectional view of an injection molding machine in accordance with the present invention.

With reference to FIG. 1, the injection molding machine of the invention includes a horizontal heatable injection cylinder 1, with a displaceable insert or element 2 disposed therein. A pressure block 3, with a feed hopper 4 at its upper end, is disposed at one end of the cyliner 1. Material is forced from the hopper 4 and through the block 3 into the cylinder 1 by a hydraulically driven plunger 5, which is reciprocally mounted in the feed hopper 4. The material is fed from a storage tank 6 to the feed hopper 4 via a chute 7.

The entire injection cylinder 1, with the displaceable insert 2 and the feed device with the plunger 5 can be moved horizontally towards a fixed mold (not shown) by means of a hydraulic cylinder 8 in such a manner that an injection nozzle 9 at the outer end of the cylinder is placed into sealing engagement with an injection nozzle in the mold.

In order to feed material in the direction of the mold, the displaceable element 2 and 5 are moved with respect to the injection cylinder 1 by means of a hydraulic press 10.

The pressure block 3 is provided with a quadrantal junction passage 11. The curvature of the passage 11 begins at the lowest point of descent of the plunger 5 during reciprocation, as shown in FIG. 1, and discharges horizontally and tangentially into a concentric bore 12 in the displaceable element 2. The bore 12 is divided into a number of outwardly converging ducts 13, which extend longitudinally through the element 2 and emerge from the displaceable element 2 in the region of a double cone-shaped tip. The total cross-sectional area of the ducts 13 corresponds approximately to the cross-sectional area of the passage 11 and of the concentric bore 12, whereby sudden increases in pressure and local overheating of the passing material cannot occur in this region.

The displaceable element 2 is in direct contact with the injection cylinder 1 over the major portion of its longitudinal extent, so that the frictiional heat generated in the displaceable element 2 can readily be removed to the outside.

Material passing through the ducts 13 enters a retention space 14 disposed in front of the injection nozzle 9. When the displaceable element 2 advances the material is forced from the retention space 14 into the mold, while the injection cylinder 1 remains stationary.

During reciprocating movement of the plunger 5, material in the feed hopper 4 is squeezed through the arcuate passage 11, and overheating in this region is thus avoided. Since liquefaction of the material has not yet occurred, the material cannot rise during the return stroke of the piston.

Figure 2:
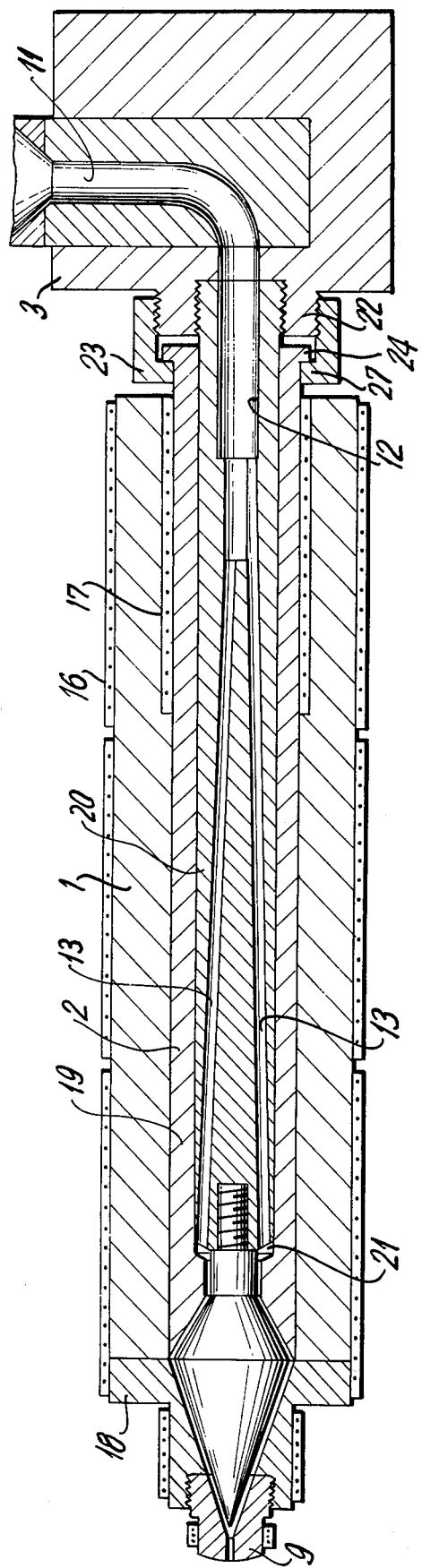
FIG. 2 is a longitudinal sectional view of an injection cylinder for use in the machine of FIG. 1.

Referring to FIG. 2, where parts similar to those in FIG. 1 are given like reference numerals, an alternate form of injection cylinder includes a displaceable element 2 disposed in an injection cylinder 1. The cylinder 1 is heated by means of wrap around heaters 16 and 17, and includes a cylindrical end plate 18 with an injection nozzle 9 mounted thereon. The displaceable element 2 consists of outer and inner parts concentric parts 19 and 20. The inner part 20 is provided with a spike-shaped head and is provided with diverging ducts 13, which terminate in an annulus 21 between the two parts 19 and 20.

The inner part 20 is rigidly connected (screwed) to a pressure block 3, which contains a continuously curved passage 11 extending from the feed device (not shown) to a bore 12 of the same cross-sectional area in the inner part 20 of the displaceable element 2. The total cross-sectional area of the ducts 13 corresponds substantially to the cross-sectional area of the bore 12.

The pressure block 3 has an externally threaded lug 22, onto which a nut 23 is threaded. The nut 23 has an outer, inwardly extending annular flange 27 for engaging a flange 24 on the inner end of the outer part 19 of the displaceable element 2, whereby such outer part 19 can be moved longitudinally by turning the nut 23.

As is readily apparent, the axial length of the annulus 21 can be varied by turning the nut 23. The size of the individual parts is such that from each set position of the outer part 19, such part 19 remains freely movable on the inner part 20 until the annulus 21 is completely closed.

During operation, plastic material is conveyed through the passage 11 into the bore 12. The material is precompressed and deaerated by frictional resistance of the continuously curved passage 11. The deaerated and precompressed material is squeezed through the diverging ducts 13, and is then liquefied by pressure, friction and squeezing. Since the total cross-sectional area of the ducts 13 corresponds approximately to the cross-sectional area of the bore 12, a fractional resistance occurs only as long as the annulus 21 is completely open.

If the annulus 21 is shortened by adjustment of the nut 23, compression in the injection cylinder increases and more friction and heat is thus produced, so that plastic materials having higher liquefaction temperatures can be liquefied. The jacket heaters 16 and 17 serve only as auxiliary heaters and are not set higher than the liquefaction temperature.

In the shot position shown in FIG. 2, in which the two parts 19 and 20 of the displaceable element 2 are moved in a direction toward the injection nozzle 9, the outer part 19, under pressure from the liquefied material, is automatically moved over the inner part 20 against the direction of flow of the plastic material until the annulus 21 is completely closed, thus providing a barrier against back flow of the material. However, this position is not shown in FIG. 2, so that the annulus 21 is shown more distinctly.

It will be appreciated that the adjustng nut 23 can be held in any set position by a fixing element, e.g., a set screw (not shown).

I claim:

1. An injection molding machine for plastic material comprising an axially elongated injection cylinder, an axially extending displaceable element mounted in said injection cylinder with the axis of said displaceable element extending in the same direction as the axis of said injection cylinder, said displaceable emement having an axially extending bore therethrough, one of said injection cylinder and displaceable element being axially movable relative to the other, said injection cylinder and displaceable element each having a first end and a second end with the first ends of each facing in the same direction and the second ends facing in the opposite direction from the first ends, an injection nozzle positioned on the first end of said injection cylinder, a feed device located adjacent the second ends of said injection cylinder and displaceable element, said feed device including a feed hopper and a plunger reciprocally mounted in said feed hopper, a pressure block positioned between said feed hopper and the second end of said displaceable element, said pressure block having a passage therethrough in communication with and extending between said feed hopper and the bore at the second end of said displaceable element, said passage having a uniform cross sectional area for the axial length thereof, the passage in said pressure block having at least a substantially continuously curving section extending from the bore at the second end of said displaceable element toward said feed hopper, said bore in said displaceable element comprising a first section extending from the second end toward the first end of said displaceable element with said first section having a uniform transverse cross sectional area for the axial length thereof, and a second section extending from the end of said first section remote from the first end of said displaceable element toward the first end of said displaceable element and said second section comprising a plurality of ducts disposed in diverging relation from said first section of said bore toward the first end of said displaceable element, said displaceable element at the first end thereof having a double cone-shaped tip, said plurality of ducts terminating at the opposite ends thereof from the first section of said bore adjacent said double cone-shaped tip, and the combined transverse cross sectional area of said plurality of ducts corresponding substantially to the transverse cross sectional area of said first section of said bore and also to the transverse cross sectional area of said passage through said pressure block.

2. An injection molding machine, as set forth in claim 1, wherein the substantially continuously curving section of said passage is quadrantal.

3. An injection molding machine, as set forth in claim 1, wherein said passageway includes a straight end section extending between the substantially curving section thereof and said feed hopper, said straight end section being in axial alignment with said plunger, and said straight end section being arranged for discharging material therefrom tangentially into the continuously curving section for subsequent tangential discharge therefrom into the first section of the bore in said displaceable element.

4. An injection molding machine, as set forth in claim 1, wherein the axially extending outer surface of said displaceable element is in contact with the axially extending inner surface of said injection cylinder over substantially the entire axial length of said cylinder.

5. An injection molding machine, as set forth in claim 1, wherein said displaceable element comprises an axially extending inner part and an axially extending outer part concentrically disposed about said inner part, said plurality of diverging ducts located in said inner part, said inner part and outer part defining an annular passage at the ends of said ducts adjacent the first end of said displaceable element, and means connected to one of said inner part and said outer part for adjusting the axial lengths of said annular passage.

6. An injection molding machine, as set forth in claim 5, wherein said outer part of said displaceable element is axially movable relative to said inner part and said means for adjusting the length of said annular passage is connected to said outer part.

* * * * *